Sept. 11, 1962   G. F. MITCHELL   3,053,227
CONVEYOR
Filed Oct. 7, 1960   3 Sheets-Sheet 1
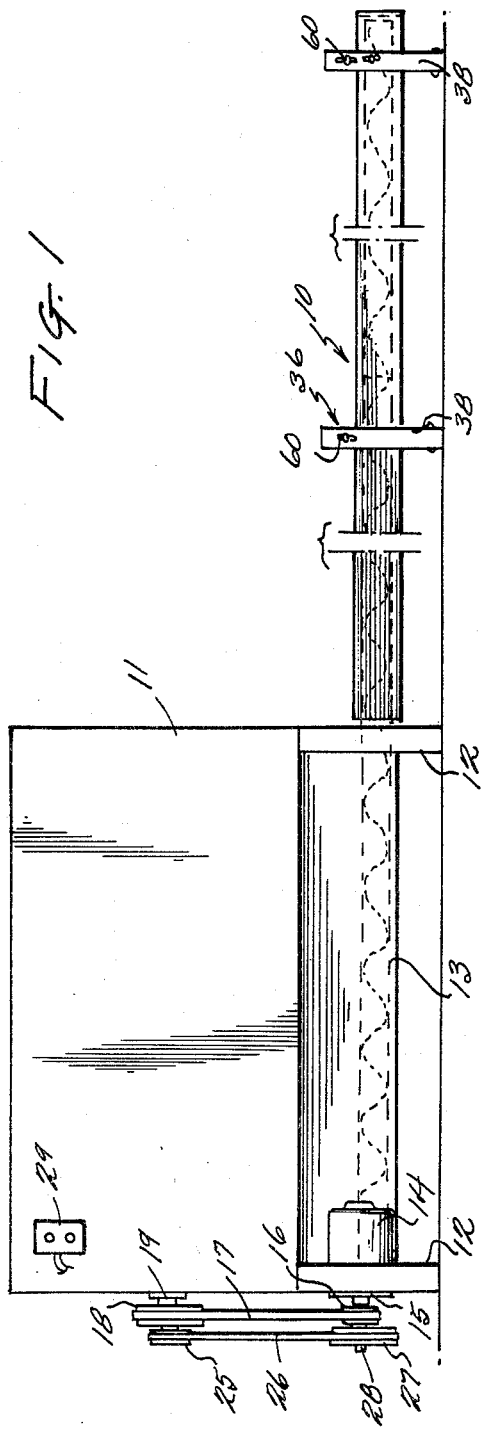
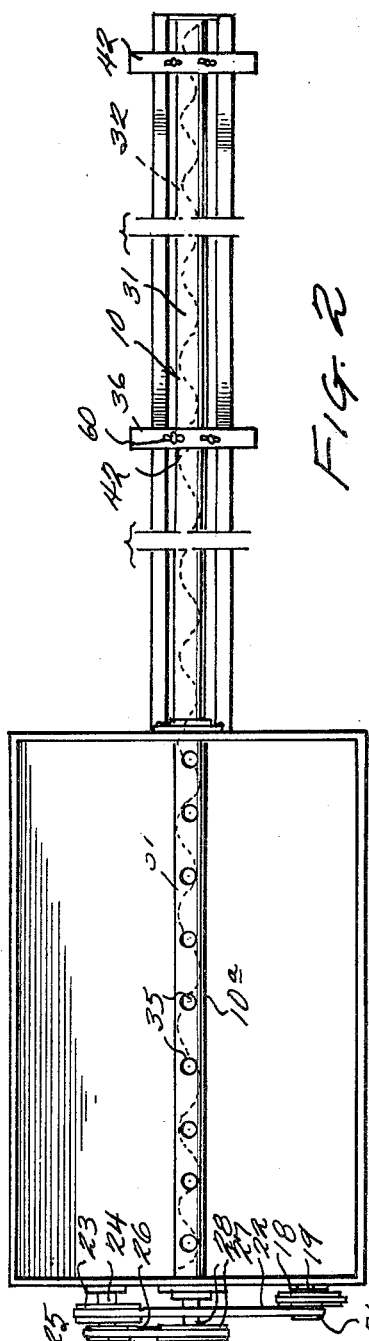
INVENTOR.
GEORGE F. MITCHELL
BY
Kimmel & Crowell
ATTORNEYS

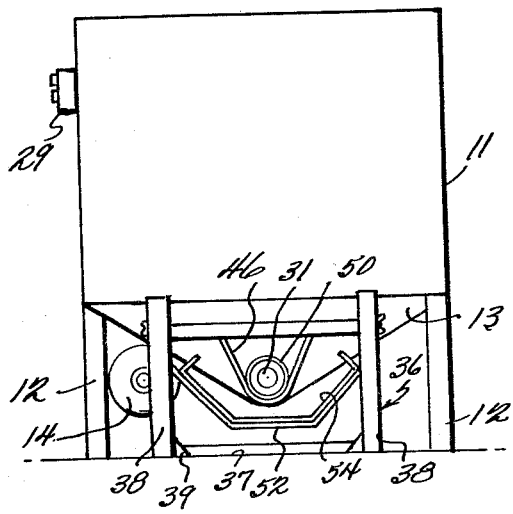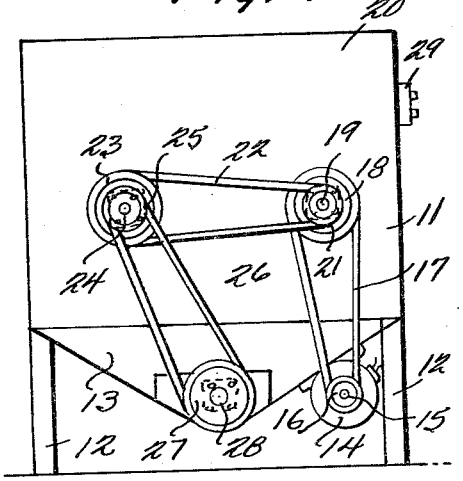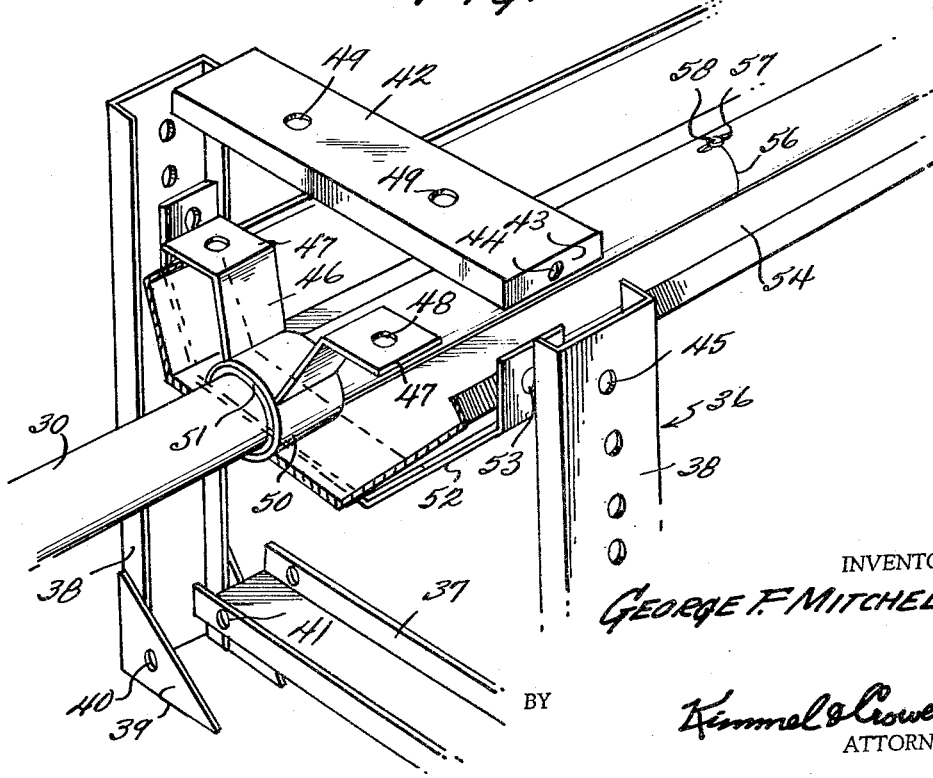

Sept. 11, 1962 G. F. MITCHELL 3,053,227
CONVEYOR
Filed Oct. 7, 1960 3 Sheets-Sheet 3
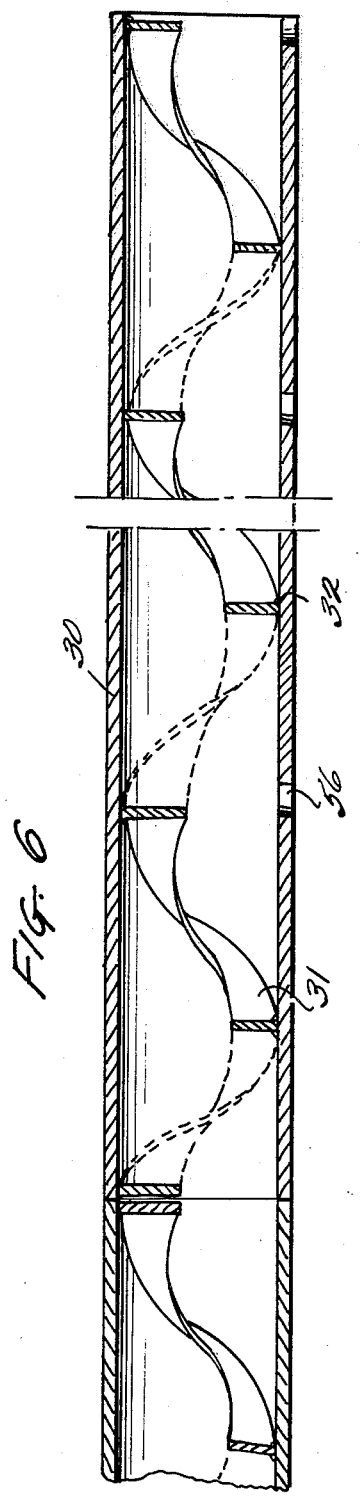
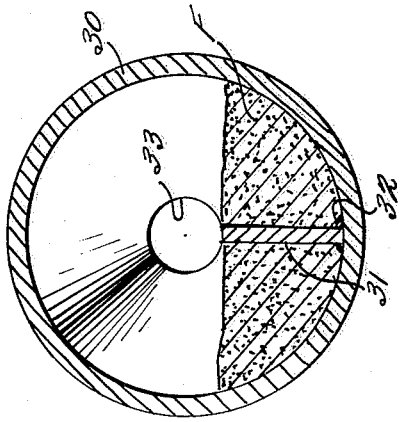
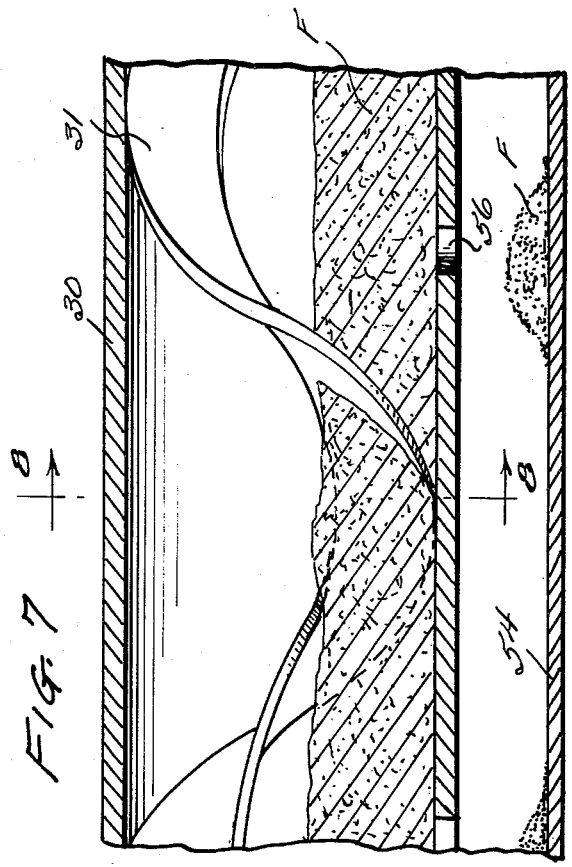
INVENTOR.
GEORGE F. MITCHELL
BY
Kimmel & Crowell
ATTORNEYS

2

United States Patent Office 3,053,227
Patented Sept. 11, 1962

3,053,227
CONVEYOR
George F. Mitchell, Sidney, Ohio, assignor to Everyday Poultry Supply Company, Sidney, Ohio, a corporation of Ohio
Filed Oct. 7, 1960, Ser. No. 61,214
4 Claims. (Cl. 119—52)

This invention relates to a conveyor apparatus so constructed and arranged as to provide for the conveying and discharging of a single material at selected points of discharge or for simultaneous conveying and selective separative discharging of an admixture of loose materials.

More particularly, the invention is adapted for use as a poultry feeder, but it will be understood and seen from the disclosure herein that the invention has other uses, as for example, in the conveying of such dry granular materials, as sand, cement, flour, feed in meal, crumbled, or pelleted forms, and feed in the form of an admixture of meal and whole or cracked grains or kernels, or any of them separately.

A primary object of the invention is, therefore, the provision of a conveyor for all dry granular materials which will move the material with a minimum of effort and difficulty, and which will discharge the material at individual selected points, the discharge being effected by means of openings, which may be graduated in size to permit the selective discharge of the selected material at a particular point.

A further and more specific object of the invention is the provision of a poultry feeder which, by virtue of its feeding arrangement, precludes either clogging of the material at one end of the discharge tube or along its length, and which will be operative only to feed the material while the material is at a predetermined level in the tube, and which by its construction precludes the admission of material thereinto above the selected level.

Still other objects of the invention reside in the combination of elements, arrangements of parts, and features of construction, all as will be more fully pointed out hereinafter and disclosed in the accompanying drawing wherein there is shown an illustrative embodiment of one form of conveyor, in the form shown, a poultry feeder, incorporating elements of the instant inventive concept.

In the drawings:

FIGURE 1 is a side elevational view, partially broken away, of one form of poultry feeder constructed in accordance with the instant invention.

FIGURE 2 is a top plan view of the device of FIG. 1.

FIGURE 3 is an end elevational view of the construction as viewed from the right in FIG. 1.

FIGURE 4 is an end elevational view of the construction as viewed from the left.

FIGURE 5 is an exploded perspective view showing the assembly of certain component parts.

FIGURE 6 is an enlarged sectional view taken through the center line of the helicoidal feed element.

FIGURE 7 is an enlarged sectional view showing feed in the feed tube, and the arrangement thereof with respect to the internal helix; and FIGURE 8 is a sectional view taken substantially along the line 8—8 of FIG. 7 as viewed in the direction indicated by the arrows.

Similar reference characters refer to similar parts throughout the several views of the drawing.

Having reference now to the drawings in detail, there is generally indicated at 10 a helicoidal feed tube, which comprises the essential element of the instant invention. In the illustrative embodiment shown the tube is shown in association with a poultry feeding device, which is comprised of a hopper 11, which is supported on suitable legs 12, and which is provided with a tapered bottom portion 13, into which one end of the helicoidal structure 10 extends, as indicated at 10a. The hopper is provided at one end with a motor 14, which through a shaft 15 drives a pulley 16. The pulley 16 drives a belt 17, which in turn drives a pulley 18 mounted on a shaft 19 which is journalled and mounted on one end 20 of hopper 11, as best shown in FIG. 4. A reduction pulley 21 is mounted on the shaft 19, and through a belt 22, drives an opposite pulley 23, mounted on a shaft 24 similar to the shaft 19, the shaft 24 carrying a reduction pulley 25, which through a belt 26 drives a main drive pulley 27 which is mounted on a shaft 28 which extends from one end of the feed helix 10a.

The motor is adapted to be controlled by means of a suitable switch 29 mounted at any convenient location on the side of a hopper 11.

The feed tube 10 is comprised by an outer sleeve 30, which has positioned therein a spiral centerless helix 31 which is fixedly secured as by welding 32 or in any desired manner to the interior of the tube 30 so that it rotates therewith. The helix 31 is of the open center type, that is, without a central drive shaft so that a central opening 33, as best shown in FIG. 8, extends the entire length of the helix.

That portion of the feed tube 10a, which extends into the hopper 11 is provided with a plurality of spaced relatively large openings 35 along its length, so that as the tube 30 is rotated by the shaft 28, which is suitably affixed to an end cap carried by the tube, feed contained within the hopper 11 is picked up by that portion of the tube, and transported therealong by the helix, in a manner which will be more full explained hereinafter.

Exteriorly of the hopper 11 the tube 10 extends to any desired length, and is supported by a requisite number of frames generally indicated at 36. Each of the frames 36, as best shown in FIG. 5, is comprised by a channel-shaped base 37 to the ends of which are secured channel-shaped uprights 38, triangular reinforcing plates 39 being provided at the ends of the members, and aligned holes 40 and 41 being provided for the accommodation of bolts or rivets. The upper extremities of the uprights 38 are connected by means of a transverse top plate 42, which has end portions 43 provided with openings 44 through which bolts are adapted to be extended engaging in a selected one of openings 45, which are aligned in vertical relation in the uprights 38 to provide for adjustability of the top plate 42. A U-shaped bracket 46 includes top flanges 47 having openings 48 therein, which are aligned with openings 49 in top plate 42, and is supported by means of suitable bolts (not shown) from each top plate 42. The lower end of bracket 46 has secured thereto a supporting cylinder 50 through which the feed tube 30 extends, suitable sleeve bearings 51 being provided in each cylinder.

Generally U-shaped brackets 52 are also provided and extend beneath the top members 42 being suitably bolted to the uprights 38 by means of bolts (not shown) which extend through holes 53 in the brackets and through selected openings 45 in the uprights 38. The height of the supporting brackets 52 may also be varied if desired. The brackets 52 are adapted to support an elongated feed trough 54 which extends the full length of the conveyor, and into which feed is deposited from the helicoidal feed member 31 through suitable openings 56 in aligned relation extending at spaced intervals along the length of the tube 30.

The tube 30 may be made of several sections, which, as best shown in FIG. 5, are shouldered at one end, as shown at 56, to permit the shouldered end to fit within the adjacent section. Slots 57 are provided in the adjacent end portions of the tube, for the accommodation of connecting pins 58, so that a plurality of sections may be readily and easily connected together with a minimum of effort and difficulty as desired. The several bolts holding the portions of the assembly together may be provided with wing nuts 60 to permit the ready assembly and disassembly thereof, as best shown in FIGS. 1 and 2.

In the use and operation of the device the hopper 11 is filled with suitable feed, or mixture of suitable feeds, and the motor 14 started by means of the switch 29. If desired, an automatic timer may be employed in place of the manual switch.

Rotation of the tube 30 and its associated internal helix 31 will cause feed to be picked up through the openings 35 on each rotation of the assembly. The feed will then pass solely by gravity along the line of the helix, being raised and lowered by each rotation of the device, and due to the passage of the feed through the opening 35 the level of the feed F will never exceed that shown in FIGS. 7 and 8, since in the event that the level rises above this point in any section of the tube it will fall back on itself in the same place without being advanced forwardly to the next spiral of the helix 31. By virtue of this arrangement clogging of the apparatus is completely precluded. The feed will progress continuously along the line of the tube until it reaches the end thereof, which may, if desired, be closed by a suitable end cap, or which may empty into a receptacle (not shown) for any overflow feed. The arrangement is such, however, that the feed is maintained at a constant level as indicated, since when this level is attained further progress of the feed is precluded since it simply falls back upon itself in the same place without progressing forwardly.

When separation of the feed is desired, it is obvious that the holes 56 may be made of different diameters, becoming progressively larger towards the outer end of the tube away from the hopper. In an arrangement of this sort the smaller particles of feed, or other material, to be conveyed will drop through the smaller holes adjacent the hopper, while the larger particles will be conveyed until they reach a hole of sufficient dimension as to permit their passage. By this means an effective separation of feed or other material may be effected in accordance with particle size as desired.

Obviously, since the basic principle of this invention is a gravity feed, when the feed in trough 54 reaches the level of openings 56, all further flow is stopped. The spacing of the bottom of the trough 54 from the openings 56 may be varied as desired to provide a desired maximum feed depth.

From the foregoing it will now be seen that there is herein provided an improved conveyor assembly which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. In a poultry feed apparatus, a hopper, a feed tube extending therefrom, said tube comprising a sleeve, an open center feed helix in said sleeve fixedly secured to the interior thereof, a portion of said tube extending into the bottom of said hopper and having relatively large feed openings therein, and means for rotating said tube and hence said helix to permit material in said tube to be progressively raised by the coils of said helix and fall by gravity in a position in advance of its previous position, said outlet openings being of different sizes to effect progressive separation of material fed into said tube, and support means for said tube, said support means comprising spaced uprights, a transverse top member releasably secured to said uprights, a bracket depending from said top member, a cylinder carried by said bracket, and a bearing in said cylinder within which said tube may rotate.

2. In a poultry feed apparatus, a hopper, a feed tube extending therefrom, said tube comprising a sleeve, an open center feed helix in said sleeve fixedly secured to the interior thereof, a portion of said tube extending into the bottom of said hopper and having relatively large feed openings therein, and means for rotating said tube and hence said helix to permit material in said tube to be progressively raised by the coils of said helix and fall by gravity in a position in advance of its previous position, said outlet openings being of different sizes to effect progressive separation of material fed into said tube, and support means for said tube, said support means comprising spaced uprights, a transverse top member releasably secured to said uprights, a bracket depending from said top member, a cylinder carried by said bracket, and a bearing in said cylinder within which said tube may rotate, and a feed trough carried by said supports extending the full length of said feed tube.

3. In a poultry feed apparatus, a hopper, a feed tube extending therefrom, said tube comprising a sleeve, an open center feed helix in said sleeve fixedly secured to the interior thereof, a portion of said tube extending into the bottom of said hopper and having relatively large feed openings therein, means for rotating said tube and hence said helix to permit material in said tube to be progressively raised by the coils of said helix and fall by gravity in a position in advance of its previous position, said outlet openings being of different sizes to effect progressive separation of material fed into said tube, support means for said tube, said support means comprising spaced uprights, a transverse top member releasably secured to said uprights, a bracket depending from said top member, a cylinder carried by said bracket, a bearing in said cylinder within which said tube may rotate, a feed trough carried by said supports extending the full length of said feed tube, and means for varying the height of said trough relative to said openings to control the quantity of feed admitted to said trough.

4. In a poultry feed apparatus, a hopper, legs on said hopper supporting same above the ground level, a feed tube extending longitudinally of the hopper along the bottom and through one end wall of the latter and having inlet openings in the length within the hopper and outlet openings in the length exteriorly of the hopper, an open center feed helix in said tube secured to the interior thereof for joint rotation, means for rotating said tube and helix for receiving material from the hopper and progressively moving same axially of the tube and over the outlet openings therein, support means for the length of the tube outside the hopper comprised by spaced uprights positioned longitudinally of the latter and mounting bearings rotatably receiving the tube, and a feed trough mounted on said spaced uprights below said tube.

References Cited in the file of this patent
UNITED STATES PATENTS

| | | |
|---|---|---|
| 745,439 | Holcomb et al. | Dec. 1, 1903 |
| 2,665,796 | Anderson | Jan. 12, 1954 |
| 2,681,639 | Littlefield | June 22, 1954 |
| 2,754,801 | Reese | July 17, 1956 |
| 2,827,156 | Linder | Mar. 18, 1958 |
| 2,867,314 | Hansen | Jan. 6, 1959 |
| 2,926,629 | Hazen | Mar. 1, 1960 |
| 2,961,126 | Craig | Nov. 22, 1960 |